US010501636B2

(12) United States Patent
Jenree et al.

(10) Patent No.: US 10,501,636 B2
(45) Date of Patent: *Dec. 10, 2019

(54) SOLAR REFLECTIVE PARTICULATES

(71) Applicant: U.S. Silica Company, Frederick, MD (US)

(72) Inventors: Rhonda Marie Jenree, Berkeley Springs, WV (US); Rocky Lee Smith, Needmore, PA (US); David Earl Weller, Jr., Greencastle, PA (US); Shih-Jen Wu, Cheyenne, WY (US)

(73) Assignee: U.S. SILICA COMPANY, Frederick, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,650

(22) Filed: Feb. 12, 2018

(65) Prior Publication Data
US 2018/0163057 A1 Jun. 14, 2018

Related U.S. Application Data

(63) Continuation of application No. 14/962,906, filed on Dec. 8, 2015, now Pat. No. 9,890,288.

(51) Int. Cl.
*C09C 3/06* (2006.01)
*E04D 7/00* (2006.01)
*C09C 1/42* (2006.01)
*C09D 5/00* (2006.01)
*C09D 133/00* (2006.01)
*C09D 7/62* (2018.01)
*C08K 13/06* (2006.01)

(52) U.S. Cl.
CPC ............... *C09C 3/06* (2013.01); *C09C 1/42* (2013.01); *C09D 5/00* (2013.01); *C09D 7/62* (2018.01); *C09D 133/00* (2013.01); *E04D 7/005* (2013.01); *C08K 13/06* (2013.01); *Y02A 30/255* (2018.01); *Y02B 80/34* (2013.01)

(58) Field of Classification Search
CPC ........ C09D 5/004; C09D 5/00; C09D 133/00; C09D 7/62; B05D 5/063; B05D 5/08; B05D 7/54; B05D 7/58; E04D 1/00; E04D 7/005; C09C 3/06; C09C 1/42; Y02B 80/34; Y02A 30/255; C08K 13/06
USPC ........................................................ 523/135
See application file for complete search history.

(56) References Cited

U.S. PATENT DOCUMENTS

| | | | |
|---|---|---|---|
| 6,872,440 B1 | 3/2005 | Kiik et al. | |
| 7,212,560 B2 | 5/2007 | Oh et al. | |
| 7,241,500 B2 | 7/2007 | Shiao et al. | |
| 7,421,500 B2 | 9/2008 | Talwar et al. | |
| 7,422,989 B2 | 9/2008 | Kalkanoglu et al. | |
| 7,592,066 B2 | 9/2009 | Shiao et al. | |
| 8,034,432 B2 | 10/2011 | Joedicke et al. | |
| 8,114,516 B2 | 2/2012 | Shiao et al. | |
| 8,277,881 B2 | 10/2012 | Khan et al. | |
| 8,361,597 B2 | 1/2013 | Shiao et al. | |
| 8,530,034 B2 | 9/2013 | Khan et al. | |
| 8,535,803 B2 | 9/2013 | Shiao et al. | |
| 8,574,712 B2 | 11/2013 | Wood et al. | |
| 8,628,850 B2 | 1/2014 | Shiao et al. | |
| 8,865,303 B2 | 10/2014 | Sexauer et al. | |
| 9,044,921 B2 | 6/2015 | Kalkanoglu et al. | |
| 2002/0160151 A1 | 10/2002 | Pinault et al. | |
| 2004/0229053 A1 | 11/2004 | Ahluwalia et al. | |
| 2005/0027110 A1 | 4/2005 | Shiao et al. | |
| 2005/0072114 A1 | 4/2005 | Shiao et al. | |
| 2006/0251807 A1 | 11/2006 | Hong et al. | |
| 2007/0054129 A1 | 3/2007 | Kalkanoglu et al. | |
| 2007/0077361 A1 | 4/2007 | Shiao et al. | |
| 2007/0218251 A1 | 9/2007 | Jacobs et al. | |

(Continued)

FOREIGN PATENT DOCUMENTS

| | | |
|---|---|---|
| CA | 2680482 A1 | 10/2008 |
| CA | 2800585 A1 | 6/2013 |

(Continued)

OTHER PUBLICATIONS

Rodriguez, Juan M. et al., "Particle Shape Quantities and Measurement Techniques—A Review", Edge, vol. 18 (2013), Bund. A, pp. 169-198.
Japanese Patent Office Action dated Jul. 31, 2018 issued in corresponding JP Application No. 2017-160084, with English translation, 10 pages.
Extended European Search Report dated Nov. 6, 2017, issued in corresponding EP Application No. 17188309.3, 7 pages.
Notice of Allowance dated Oct. 2, 2018, issued in corresponding CA Application No. 2,951,213, 1 sheet.

(Continued)

*Primary Examiner* — David T Karst
(74) *Attorney, Agent, or Firm* — LKGlobal | Lorenz & Kopf, LLP

(57) ABSTRACT

A reflective particulate composition includes a particulate substrate, and an inorganic binder, a pigment, and a hydrophobic coating on the particulate substrate. The composition may have a solar reflectance of 70% or greater. The pigment may include a clay, and the hydrophobic coating may include a (meth)acrylic polymer, a coupling agent, a wax and an antioxidant. A method of making the composition may include mixing the pigment, the inorganic binder, a dispersant and water to form a pigment mixture, adding the particulate substrate to the pigment mixture, heat treating the pigmented particulate, and mixing the pigmented particulate with a hydrophobic coating composition. Alternatively, the method may include first mixing the particulate substrate with one of the inorganic binder or the pigment, and then mixing the resulting composition with the other of the inorganic binder and the pigment, and heat treating the pigmented particulate.

18 Claims, No Drawings

(56) References Cited

U.S. PATENT DOCUMENTS

| | | |
|---|---|---|
| 2008/0241472 A1 * | 10/2008 | Shiao .................. C09C 3/063 428/144 |
| 2008/0248242 A1 | 10/2008 | Shiao et al. |
| 2008/0261007 A1 | 10/2008 | Hong et al. |
| 2008/0277056 A1 | 11/2008 | Kalkanoglu et al. |
| 2009/0064628 A1 | 3/2009 | Mellott, II et al. |
| 2010/0104809 A1 | 4/2010 | Duda et al. |
| 2010/0203336 A1 | 8/2010 | Shiao et al. |
| 2011/0081537 A1 | 4/2011 | Sexauer et al. |
| 2011/0223385 A1 | 9/2011 | Shiao et al. |
| 2011/0283836 A1 | 11/2011 | Hitchings et al. |
| 2011/0311774 A1 | 12/2011 | Giri et al. |
| 2012/0107625 A1 | 5/2012 | Smith et al. |
| 2012/0164385 A1 | 6/2012 | Heulings et al. |
| 2012/0288678 A1 | 11/2012 | Grube et al. |
| 2013/0108873 A1 | 5/2013 | Shiao et al. |
| 2013/0168616 A1 | 7/2013 | Shiao et al. |
| 2014/0120316 A1 | 5/2014 | Hong et al. |
| 2014/0370242 A1 | 12/2014 | Constantz et al. |
| 2015/0113901 A1 | 4/2015 | Bai et al. |
| 2015/0192698 A1 | 7/2015 | Joedicke et al. |

FOREIGN PATENT DOCUMENTS

| | | |
|---|---|---|
| JP | 2003082289 A | 3/2003 |
| JP | 2008006391 A | 1/2008 |
| WO | WO2008121749 A1 | 10/2008 |
| WO | WO2013192336 A1 | 12/2013 |
| WO | WO2015112590 A1 | 7/2015 |

OTHER PUBLICATIONS

CA Office action dated Feb. 2, 2018, issued in corresponding CA Application No. 2,951,213, 4 pages.

* cited by examiner

SOLAR REFLECTIVE PARTICULATES

CROSS-REFERENCE TO RELATED APPLICATION(S)

This application is a continuation of and claims priority to and the benefit of U.S. application Ser. No. 14/962,906 filed Dec. 8, 2015, now U.S. Pat. No. 9,890,288, the entire content of which is incorporated herein by reference.

BACKGROUND

Commercial and residential roofs are continuously exposed to the outside elements, which are often harsh or extreme. Even under moderate external conditions, these roofs are exposed to environmental or weather conditions that affect the ability of the roofs to insulate the building or residence interiors from the effects of the environmental or weather conditions. In many parts of the world, during the summer months, roofs are continuously exposed to high heat and sunny conditions under which the roofing materials absorb solar energy and retain high levels of heat. As the roofs absorb the solar energy and retain heat, the conditions inside the underlying buildings or residences suffer adversely, which often causes the interiors to heat up to uncomfortable conditions. In order to remedy these conditions, the buildings or residences often resort to increased amounts of internal insulation, or increased use of artificial cooling systems (e.g., HVAC equipment). However, increasing the amount of insulation has a limited ability to reduce heat transfer, and increasing energy costs make the increased use of artificial cooling systems undesirable or even cost-prohibitive.

SUMMARY

According to embodiments of the present invention, a reflective particulate composition comprises a particulate substrate, an inorganic binder coated on the particulate substrate, a pigment coated on the particulate substrate, and a hydrophobic exterior coating. The reflective particulate composition may have a solar reflectance of 70% or greater.

The particulate substrate may have a particle size distribution in which a majority of particles of the particulate substrate have a size between 12 and 50 mesh. In some embodiments, the particulate substrate includes silica as the primary component, e.g., in an amount of 50% by weight or greater based on 100% by weight of the particulate substrate.

In some embodiments, the inorganic binder may be selected from alkali metal silicates, alkali metal carbonates, alkali metal sulfates, alkaline earth metal silicates, alkaline earth metal carbonates, alkaline earth metal sulfates, boric acid, Portland cement, alkyl silicates, and combinations thereof. The inorganic binder may be present in the reflective particulate composition in an amount of 20% by weight or less, based on 100% by weight of the particulate substrate.

The pigment may comprise a clay-based pigment composition that includes a kaolin clay as the primary component. The kaolin clay may be present in the clay-based pigment composition in an amount of 50% by weight or greater based 100% by weight of the clay-based pigment composition. The clay-based pigment composition may further include one or more secondary pigment components selected from metal oxides, alkaline earth metal sulfates, alkaline earth metal silicates, alkali metal silicates, and cristobalite. The pigment may be present in the reflective particulate composition in an amount of 25% by weight or less based on 100% by weight of the particulate substrate.

The hydrophobic exterior coating may include a (meth) acrylic polymer, a coupling agent, a wax and an antioxidant. The coupling agent may include a silane coupling agent. The wax may be selected from polyethylene wax, polypropylene wax, carnauba wax, paraffin wax, microcrystalline wax, scale wax, acrylic wax, and combinations, emulsions, or co-emulsions thereof.

The antioxidant may include an alkali or alkaline earth metal salt of hypophosphorous acid. For example, in some embodiments, the antioxidant may include sodium hypophosphite.

According to some embodiments, a method of making the reflective particulate composition includes mixing the pigment, the inorganic binder, a dispersant and water to form a pigment mixture, adding the particulate substrate to the pigment mixture to form a pigmented particulate, and heat treating the pigmented particulate. The method further includes mixing the pigmented particulate with a hydrophobic coating composition to form the hydrophobic exterior coating on the pigmented particulate.

The hydrophobic coating composition may include a (meth)acrylic polymer, a wax and a silane coupling agent. The hydrophobic coating composition may be formed by mixing the (meth)acrylic polymer, the wax and the silane coupling agent to form a mixture, and adding an acid to the mixture.

In some embodiments, a method of making the reflective particulate composition includes mixing the particulate substrate with the inorganic binder to form a binder particulate substrate, mixing the binder particulate substrate with the pigment to form a pigmented particulate, and heat treating the pigmented particulate. The heat treatment may be performed at a temperature of 300 C to 1100 C.

According to some embodiments, a method of making the reflective particulate composition includes mixing the particulate substrate with the pigment to form a pigment particulate substrate, mixing the pigment particulate substrate with the inorganic binder to form a pigmented particulate, and heat treating the pigmented particulate. The heat treatment may be performed at a temperature of 300 C to 1100 C.

DETAILED DESCRIPTION

The reduction of heat transfer from the external environment to the interior working or living space of a building is becoming increasingly important as the cost of energy increases. In particular, while the interior space of a residence or building can generally be kept comfortable through the use of artificial cooling systems (e.g., HVAC systems), as energy costs rise, the cost of maintaining a comfortable working or living space also increases. Consequently, methods for reducing the transfer of heat from the external environment to the interior space of a building or residence are desirable. Indeed, such a reduction of heat transfer would reduce the amount of time the artificial cooling systems would need to run to maintain a comfortable interior space, thereby reducing the amount of energy consumed by those cooling systems.

According to embodiments of the present invention, a particulate roofing material includes a solar reflective coating system, and the particulate material has a total solar reflectance (also referred to herein as simply "solar reflectance") of 70% or greater as measured using a reflectometer from Surface Optics Corporation (San Diego, Calif.). For example, the 410-Solar visible/NIR Portable Reflectometer from Surface Optics Corporation (San Diego, Calif.) may be used, which measures reflectance over 7 wavelength bands and uses an algorithm to calculate the total solar reflectance. In some embodiments, the particulate roofing material has a solar reflectance of at least 50%, for example, at least 60% or at least 70%. For example, in some embodiments, the particulate roofing material has a solar reflectance of 50% to 80%, 60% to 80%, 70% to 86%, 71% to 85%, or 70% to 80%. Additionally, the particulate roofing material may have a UV reflectance of at least 5%, for example 5% to 15%. In some embodiments, the particulate roofing material may have a UV reflectance of at least 25%, for example 25% to 65%, 25% to 60%, or 25% to 50%, as measured using a reflectometer from Surface Optics Corporation (San Diego, Calif.). Also, the particulate roofing material may have an IR reflectance of at least 60%, for example 60% to 90%, or 60% to 80%, as measured using reflectometer from Surface Optics Corporation (San Diego, Calif.). The particulate roofing material may also have an American Foundry Society Grain Fineness Number of 10 to 25, for example, 10 to 15.

Additionally, in some embodiments, the particulate roofing material may have a bulk density of 65 g/cm$^3$ to 95 g/cm$^3$, for example 70 g/cm$^3$ to 90 g/cm$^3$, or 75 g/cm$^3$ to 85 g/cm$^3$. In some embodiments, the particulate roofing material may have a bulk density of 80 g/cm $^3$.

As used herein, the term "particulate roofing material," and like terms, refer to solar reflective particulates or granules that are useful in so-called "cool roof" applications, and indeed, the term "particulate roofing material" is used interchangeably with the terms "solar reflective particulates," "solar reflective granules," "reflective particulates," "reflective granules," and like terms. Additionally, while the particulates and granules described herein are touted for their efficacy in "cool roof" applications, it is understood that the described particulates and granules may have other uses and applications, and that the described embodiments are not limited to use in "cool roof" applications.

According to embodiments of the present invention, the reflective particulates or granules include a particulate (or granular) base substrate, an inorganic binder, a pigment, and a hydrophobic exterior coating. The substrate may include any suitable particulate substrate, such as for example, sand, or silica-based sand. Non-limiting examples of suitable particulate substrates include silica sand, zircon sand, olivine sand, lake sand, chromite sand, talc sand, and quartz sand. In some embodiments, for example, the particulate substrate may include a silica-based sand. As used herein, the term "silica-based sand" refers to particulate substrates that include silica as the primary constituent (i.e., silica is present in the sand in the largest quantity over any other ingredient). Also, in some embodiments, the silica-based sand includes a majority of silica, i.e., silica is present in the silica-based sand in an amount of 50% by weight or greater. While the silica-based sand includes silica as the primary constituent, the particulate substrate may include secondary constituents. For example, in some embodiments, the particulate substrate may include one or more secondary oxides as the secondary constituent, nonlimiting examples of which include trydimite, cristobalite, aplite, feldspar, $Al_2O_3$, $TiO_2$, CaO, MgO, $Na_2O$, $K_2O$, $Fe_2O_3$ and $P_2O_5$. In some embodiments, for example, the secondary constituent includes trydimite, cristobalite, aplite, feldspar, and/or $Al_2O_3$, and in some embodiments the secondary constituent includes $Al_2O_3$ in addition to one or more other secondary oxides or other secondary constituents. In some embodiments, the secondary constituents may be present in the particulate substrate in an amount of less than 50% by weight, for example, 40% by weight or less. In some embodiments, for example, the particulate substrate may include silica in an amount 50% by weight or greater, alumina (i.e., $Al_2O_3$) in an amount of 20% by weight or greater, with other secondary constituents (e.g., trydimite, cristobalite, aplite, feldspar, $TiO_2$, CaO, MgO, $Na_2O$, $K_2O$, $Fe_2O_3$ and/or $P_2O_5$) making up the remainder of the particulate substrate. In some embodiments, the particulate substrate includes silica in an amount of 50% or greater, and one or more of trydimite, cristobalite, aplite and/or feldspar as the secondary constituents making up the remainder of the particulate substrate. For example, in some embodiments, the particulate substrate includes a mixture of silica with one or more of trydimite, cristobalite, aplite and/or feldspar as the secondary constituents, and in some embodiments, the particulate substrate includes a mixture of silica with all of trydimite, cristobalite, aplite and feldspar as the secondary constituents.

In some embodiments, the particulate substrate is opaque or semi-opaque in appearance. Also, in some embodiments, the particulate substrate has an angular to sub-rounded shape, for example an angular shape. The terms "angular" and "sub-rounded" as they relate to particle shape are terms of art known to those of ordinary skill in the art, and are used herein in their art-recognized senses. Indeed, the particle shapes referenced herein are as discussed in Rodriguez et al., "Particle Shape Quantities and Measurement Techniques—A Review," *EJGE*, vol. 18, Bund. A, pgs. 169-198 (2013), the entire contents of which are incorporated herein by reference. For example, an overview of different particle size descriptors can be found in Table 4 of Rodriguez at page 181, which is also specifically incorporated herein by reference.

Additionally, in some embodiments, the particulate substrate may have a Mohs hardness of 6 or greater. For example, in some embodiments, the particulate substrate has a Mohs hardness of 6 to 9, or 6 to 8. Also, the particulate substrate may have an average particle size, as determined by standard sieve analysis, of 10 to 200 mesh, for example 10 to 100 mesh, 10 to 50 mesh, or 16 to 40 mesh. In some embodiments, for example, the particulate substrate may have varying particle sizes making up a particle size distribution that averages to an average particle size within the 10 to 200 mesh range (or the 10 to 200, 10 to 100, 10 to 50 or 16 to 40 mesh ranges). For example, the standard sieve analysis to determine the particle size distribution may involve placing the sample to be measured in a stack of standard mesh sieves with varying mesh sizes, and then using a roto-tap on the sample for 10 minutes, after which the percent of the sample retained on each sieve is measured to obtain the particle size distribution. For example, in some embodiments, the particulate substrate may include smaller particles having a particle size of 30 mesh or smaller (for example 20 mesh or smaller or 16 mesh or smaller), and larger particles having a particle size of 40 mesh or greater, for example, 50 mesh or greater, 100 mesh or greater, or 200 mesh or greater.

In some embodiments, the particulate substrate has a particle size distribution in which the majority of particles have a size between 12 and 50 mesh, for example between 16 and 40 mesh. For example, in some embodiments, 100% of the particles of the particulate substrate have particle sizes between 12 and 50 mesh. In some embodiments, 85% or more of the particles of the particulate substrate have particle sizes between 12 and 50 mesh, and in some embodiments 90% or more of the particles of the particulate substrate have particle sizes between 12 and 50 mesh. In some embodiments, for example, 95% or more of the particles of the particulate substrate have particle sizes between 12 and 50 mesh.

In some embodiments, the particulate substrate has a particle size distribution in which the majority of particles have a size between 12 and 40 mesh, for example between 16 and 40 mesh. For example, in some embodiments, 100% of the particles of the particulate substrate have particle sizes between 12 and 40 mesh. In some embodiments, 80% or more of the particles of the particulate substrate have particle sizes between 12 and 40 mesh, and in some embodiments 85% or more of the particles of the particulate substrate have particle sizes between 12 and 40 mesh. In some embodiments, for example, 90% or more of the particles of the particulate substrate have particle sizes between 12 and 40 mesh, and in some embodiments 90% or more of the particles of the particulate substrate have particle sizes between 12 and 40 mesh.

In some embodiments, the particulate substrate has a particle size distribution in which the majority of particles have a size between 16 and 50 mesh, for example, between 16 and 40. For example, in some embodiments, 100% of the particles of the particulate substrate have particle sizes between 16 and 50 mesh. In some embodiments, 80% or more of the particles of the particulate substrate have particle sizes between 16 and 50 mesh, and in some embodiments 85% or more of the particles of the particulate substrate have particle sizes between 16 and 50 mesh. In some embodiments, for example, 90% or more of the particles of the particulate substrate have particle sizes between 16 and 50 mesh, and in some embodiments 90% or more of the particles of the particulate substrate have particle sizes between 16 and 50 mesh.

In addition, according to embodiments of the present invention, the particulate substrate may have a particle size distribution in which up to 10% (i.e., from 0% to 10%, or greater than 0% to 10%) of the particles have a particle size of 12 mesh, for example, up to 7% or 6% of the particles may have a particle size of 12 mesh. In some embodiments, the particulate substrate may have a particle size distribution in which up to 30% (i.e., from 0% to 30%, or greater than 0% to 30%) of the particles have a particle size of 16 mesh, for example, up to 25% or 24% of the particles may have a particle size of 16 mesh. According to some embodiments, the particulate substrate may have a particle size distribution in which up to 40% (i.e., from 0% to 40%, or greater than 0% to 40%) of the particles have a particle size of 20 mesh, for example, up to 35% or 33% of the particles may have a particle size of 20 mesh. Additionally, in some embodiments, the particulate substrate may have a particle size distribution in which up to 60% (i.e., from 0% to 60%, or greater than 0% to 60%) of the particles have a particle size of 30 mesh, for example, up to 55% or 51% of the particles may have a particle size of 30 mesh. In some embodiments, the particulate substrate may have a particle size distribution in which up to 25% (i.e., from 0% to 25%, or greater than 0% to 25%) of the particles have a particle size of 40 mesh, for example, up to 20% or 18% of the particles may have a particle size of 40 mesh. Also, in some embodiments, the particulate substrate may have a particle size distribution in which up to 10% (i.e., from 0% to 10%, or greater than 0% to 10%) of the particles have a particle size of 50 mesh, for example, up to 8% or 7% of the particles may have a particle size of 50 mesh. Additionally, in some embodiments, the particulate substrate may have a particle size distribution in which up to 10% (i.e., from 0% to 10%, or greater than 0% to 10%) of the particles have a particle size of 70 mesh, for example, up to 7% or 6% of the particles may have a particle size of 70 mesh. In some embodiments, the particulate substrate may have a particle size distribution in which up to 5% (i.e., from 0% to 5%, or greater than 0% to 5%) of the particles have a particle size of 100 mesh, for example, up to 4% or 3% of the particles may have a particle size of 100 mesh. In some embodiments, the particulate substrate may have a particle size distribution in which up to 2% (i.e., from 0% to 2%, or greater than 0% to 2%) of the particles have a particle size of 140 mesh, for example, up to 1% or 0.5% of the particles may have a particle size of 140 mesh. Also, in some embodiments, the particulate substrate may have a particle size distribution in which up to 1% (i.e., from 0% to 1%, or greater than 0% to 1%) of the particles have a particle size of 200 mesh, for example, up to 0.5% or 0.2% of the particles may have a particle size of 200 mesh. In some exemplary embodiments, the particulate substrate may have one of the particle size distributions as indicated in the following Table 1. However, it is understood that the distributions indicated in Table 1 are examples only, and the particulate substrate is not limited to the listed distributions.

TABLE 1

Individual % Retained of Uncoated Material

| Mesh Size | Dist. 1 | Dist. 2 | Dist. 3 | Dist. 4 | Dist. 5 |
| --- | --- | --- | --- | --- | --- |
| 12 | 0-10 | 0-10 | 0 | 0-10 | 0 |
| 16 | 0-25 | 0-25 | 0-25 | 0-15 | 0 |
| 20 | 0-25 | 0-25 | 0-40 | 0-30 | 0-25 |
| 30 | 0-30 | 0-60 | 0-60 | 0-60 | 0-50 |
| 40 | 0-20 | 0-20 | 0-20 | 0-20 | 0-20 |
| 50 | 0-5 | 0-10 | 0-10 | 0-10 | 0-10 |
| 70 | 0-5 | 0 | 0 | 0 | 0-10 |
| 100 | 0-3 | 0 | 0 | 0 | 0-5 |
| 140 | 0-1 | 0 | 0 | 0 | 0-2 |
| 200 | 0 | 0 | 0 | 0 | 0-1 |

The substrate may be present in the composition in any amount relative to the other components so long as the amounts of the substrate, the inorganic binder, the pigment and the hydrophobic exterior coating are suitable to substantially coat the substrate. For example, in some embodiments, the particulate substrate may be present in the reflective particulates in an amount of about 70 wt % to about 90 wt %, for example, about 75 wt % to about 85 wt %, or about 78 wt % to about 82 wt %.

The inorganic binder may be any suitable inorganic binder capable of acting as a binder between the particulate substrate and the pigment. Nonlimiting examples of the inorganic binder include alkali metal silicates, alkali metal carbonates, alkali metal sulfates, alkaline earth metal silicates, alkaline earth metal carbonates, alkaline earth metal sulfates, boric acid, Portland cement, and alkyl silicates. In some embodiments, for example, the binder may include sodium silicate, potassium silicate, calcium silicate, magnesium silicate, sodium carbonate, potassium carbonate, calcium carbonate, magnesium carbonate, sodium sulfate, potassium sulfate, calcium sulfate, magnesium sulfate, boric acid, Portland cement, and/or tetraethylorthosilicate. For example, in some embodiments, the binder may include sodium silicate, potassium silicate, sodium carbonate, calcium sulfate, boric acid, Portland cement, and/or tetraethylorthosilicate (such as, for example, the SILQUEST® TEOS pure or technical grade tetraethylsilicate products available from Momentive Performance Materials, Inc.

(Waterford, N.Y.)). Any single inorganic binder may be used, or a combination of two or more of the binder materials may be used.

The inorganic binder may be present in the reflective particulates in an amount of 20% by weight or less, based on 100% by weight of the particulate substrate. For example, in some embodiments, the inorganic binder may be present in the reflective particulates in an amount of 15% by weight or less, based on 100% by weight of the particulate substrate. In some embodiments, for example, the inorganic binder may be present in the reflective particulates in an amount of 5% by weight to 20% by weight, or 5% by weight to 15% by weight, based on 100% by weight of the particulate substrate. Also, in some embodiments, the inorganic binder may be present in the reflective particulates in an amount of 1% by weight to 7% by weight, based on the total weight of the reflective particulates. In some embodiments, for example, the inorganic binder may be present in the reflective particulates in an amount of 2% by weight to 6% by weight, or 3% by weight to 5% by weight, based on the total weight of the reflective particulates.

The pigment may be any suitable pigment capable of imparting a reflective pigment (e.g., a white pigment) to the reflective particulates. Nonlimiting examples of suitable pigments include transition metal oxides, and clays. For example, in some embodiments, the pigment may include a transition metal oxide and/or a kaolin clay. In some embodiments, for example, the pigment may include titanium dioxide, hydrous kaolin clay and/or calcined kaolin clay. Nonlimiting examples of suitable clay pigments include the SNOWTEX® line of products available from U.S. Silica (Frederick, Md.), and the SatinTone line of products (e.g., SatinTone 5HB) available from BASF Corporation (Florham Park, N.J.).

In some embodiments, the pigment includes a clay-based pigment composition. As used herein, the term "clay-based pigment composition" refers to pigment compositions that include clay (e.g., hydrous or calcined kaolin clay) as the primary component (i.e., clay is present in the pigment composition in the largest quantity over any other component). Also, in some embodiments, the clay-based pigment composition includes a majority of clay, i.e., clay is present in the clay-based pigment composition in an amount of 50% by weight or greater. In some embodiments, for example, the clay is present in the clay-based pigment composition in an amount of 60% by weight or greater, or 50% by weight to 80% by weight.

While the clay-based pigment composition includes clay (e.g., hydrous or calcined kaolin) as the primary component, the clay-based pigment composition may include secondary pigment components. For example, the secondary pigment components may include additional pigment materials, and/or pigment additives. Some nonlimiting examples of suitable secondary pigment components include transition metal oxides (e.g., $TiO_2$, ZnO, and various titanates), alkaline earth metal sulfates (e.g., $BaSO_4$, $MgSO_4$ (including anhydrous or hydrated forms, such as, e.g., epsom salt) and the like), alkaline earth metal silicates, alkali metal silicates, and minerals (e.g., cristobalite). For example, in some embodiments, the secondary pigment component may include $TiO_2$, $BaSO_4$, ZnO, an alkali metal silicate, an alkaline earth metal silicate, and/or cristobalite. In some embodiments, for example, the clay-based pigment composition may include the clay (e.g., hydrous or calcined kaolin) in an amount of 50% by weight or greater, with the remainder of the composition being one or more of $TiO_2$, $BaSO_4$, ZnO, an alkali metal silicate, an alkaline earth metal silicate, and/or cristobalite. For example, the secondary pigment components may be present in the clay-based pigment composition in an amount of less than 50% by weight. In some embodiments, for example, the secondary pigment components are present in the clay-based pigment composition in a positive amount (i.e., greater than 0% by weight) up to 49% by weight. For example, in some embodiments, the secondary pigment components may be present in the clay-based pigment composition in an amount of 1% by weight to 40% by weight %, 5% by weight to 30% by weight, or 10% by weight to 25% by weight. For example, when a secondary pigment is present, the primary pigment (whether clay-based or not clay-based (such as, for example, a transition metal oxide)) and the secondary pigment components may be present in the pigment in a weight ratio of 70:30 to 90:10, for example 75:25 to 90:10, or 80:20 to 90:10.

To impart a non-white pigment to the reflective particulates, or to provide other beneficial properties, the pigment (or clay-based pigment composition) may include a pigment additive, such as a non-white additive, an anti-microbial additive, a reflectivity additive, etc. Suitable such additives (e.g., non-white additives) include transition metal sulfates, transition metal nitrates, and various pigments available from Ferro Corporation, Mayfield Heights, Ohio (e.g., the pigments sold under the trade names GEODE®, COOL COLORS® and ECLIPSE®). For example, in some embodiments, the additive may include $CuSO_4$, $AgNO_3$, and/or a pigment available from Ferro Corporation. In the clay-based pigment composition, the additive may be included as one of the secondary pigment components of the clay-based pigment composition, and may be included in the amounts described above in connection with the secondary pigment components.

Some nonlimiting examples of suitable secondary pigment components and pigment additives include the ALTIRIS® line of pigments (e.g., ALTIRIS® 550 pigment and ALTIRIS® 800 pigment) available from Huntsman (Stockton-On-Tees, United Kingdom), the Ti-PURE® line of titanium dioxide pigments (e.g., Ti-PURE® R-900 or Ti-Pure® R-960) available from E.I. du Pont de Nemours and Company (Wilmington, Del.), the TYZOR® line of organic titanates (e.g., TYZOR® 217) also available from E.I. du Pont de Nemours and Company (Wilmington, Del.), the TYZOR® line of organic titanates and zirconates (e.g., TYZOR® TE (an organic titanate) and TYZOR® TEAZ (an organic zirconate)) available from Dorf Ketal Chemicals Pvt. Ltd. (Maharashtra, India).

The pigment (i.e., the pigment composition as a whole including the clay and any pigment additives) may be present in the reflective particulates in an amount of 25% by weight or less, based on 100% by weight of the particulate substrate. For example, in some embodiments, the pigment may be present in the reflective particulates in an amount of 20% by weight or less, based on 100% by weight of the particulate substrate. In some embodiments, for example, the pigment may be present in the reflective particulates in an amount of 5% by weight to 20% by weight, or 10% by weight to 20% by weight, based on 100% by weight of the particulate substrate. Also, in some embodiments, the pigment may be present in the reflective particulates in an amount of 1% by weight to 20% by weight, based on the total weight of the reflective particulates. In some embodiments, for example, the pigment may be present in the reflective particulates in an amount of 1% by weight to 15% by weight, 5% by weight to 15% by weight, 5% by weight to 13% by weight, or 7% by weight to 12.5% by weight, based on the total weight of the reflective particulates.

In some embodiments, the pigment may include a clay-based pigment (e.g., hydrous kaolin clay and/or calcined kaolin clay) without the addition of secondary pigments. When the clay-based pigment is used alone as the pigment, the clay-based pigment may be present in an amount of 5% to 20% by weight, based on the weight of the substrate. For example, in some embodiments, the clay-based pigment may be present in an amount of 10% to 15% by weight, for example 10% or 15% by weight, based on the weight of the substrate.

Additionally, in some embodiments, the pigment may include a non-clay-based pigment without the addition of a clay-based pigment. However, in these embodiments, the non-clay-based pigment should be selected to provide a total solar reflectance of the pigmented particulate (i.e., the substrate coated with the pigment and inorganic binder but not the hydrophobic coating) that is suitable to provide a reflective particulate (i.e., coated with the hydrophobic coating) with a sufficient total solar reflectance. As described further below, application of the hydrophobic coating tends to reduce the total solar reflectance of the reflective particulate (i.e., compared to the pigmented particulate without the hydrophobic coating). As such, in some embodiments, the pigment used to form the pigmented particulate is selected to provide a starting total solar reflectance that will not reduce below a threshold level after application of the hydrophobic coating, as discussed further below. In some embodiments excluding a clay-based pigment, for example, the non-clay-based pigment may include cristobalite. The cristobalite (or other non-clay-based pigment), for example, may be present in the pigmented particulate in an amount of 5% to 20% by weight, based on the weight of the substrate. For example, in some embodiments, the cristobalite (or other non-clay-based pigment) may be present in the pigmented particulate in an amount of 5% to 15%, 5% to 10%, or 10% to 15% by weight, for example 10% by weight, based on the weight of the substrate. When the non-clay-based pigment (e.g., cristobalite) is present in an amount within these ranges, the pigmented particulate may have a total solar reflectance suitable for preparing a reflective particulate with a sufficient total solar reflectance. For example, in some embodiments, when the non-clay-based pigment (e.g., cristobalite) is present in an amount within these ranges, the pigmented particulate (i.e., prior to application of the hydrophobic coating) may have a total solar reflectance of 80% to 90%, for example 80% to 85%, or 80% to 83%.

The hydrophobic exterior coating provides weather and UV resistance to the reflective particulates, and is formed from a coating composition that includes a (meth)acrylic polymer, a wax and a coupling agent. In some embodiments, the hydrophobic exterior coating may further include an antioxidant. The coating composition may also further include an acid to aid in hydrolyzing the coupling agent. The components of the coating composition are mixed to a coatable consistency, which is then applied to the pigmented substrate particles (i.e., the particulate substrate coated with the inorganic binder and the pigment). For example, the components of the coating composition may be mixed for a minimum of one hour, or any length of time sufficient to prepare a substantially homogenous composition. As used herein, the term "substantially" is used as a term of approximation, and not as a term of degree, and reflects the penumbra of variation associated with measurement, significant figures, and interchangeability, all as understood by a person having ordinary skill in the art to which this disclosure pertains. For example, a mixture of the coating composition components may be considered "substantially" homogenous if the mixture contains small pockets which may not be homogenously mixed but which pockets do not significantly affect the homogeneity of the mixture as a whole.

The amount of the hydrophobic exterior coating may be selected in order to alleviate excess dusting, and to prevent or reduce the amount of agglomeration. For example, if the hydrophobic coating is present in an amount that is too low, the resulting roofing particulate may exhibit excess dusting. Conversely, if the hydrophobic exterior coating is present in an amount that is too high, the resulting roofing particulate may exhibit excess agglomeration. In some embodiments, for example, the hydrophobic exterior coating may make up 5wt % or less of the roofing particulate (i.e., the total weight of the substrate, pigment, hydrophobic exterior coating, etc.). For example, in some embodiments, the hydrophobic exterior coating makes up 3 wt % or less of the roofing particulate. In some embodiments, the hydrophobic exterior coating makes up 2 wt % or less, or 1.5 wt % to 2 wt %.

As used herein, the term "(meth)acrylic" and like terms, encompass both acrylics and methacrylics. The (meth)acrylic polymer may be any suitable acrylic or methacrylic polymer, and may be prepared by any suitable polymerization technique (including, but not limited to, emulsion polymerization, solution polymerization, bulk polymerization, etc.). Indeed, the (meth)acrylic polymer is not particularly limited, and may be any such polymer known for use in various exterior applications, such as various external paint applications. For example, any (meth)acrylic polymer capable of providing a suitably low glass transition temperature (Tg), weathering resistance and/or asphalt adhesion to the roofing particulate, may be used. In some embodiments, for example, the (meth)acrylic polymer may have a glass transition temperature of 20° C. or lower, for example 15° C. or lower. In some embodiments, for example, the (meth)acrylic polymer may have a glass transition temperature of −50° C. to 20° C., −50° C. to 15° C., −40° C. to 20° C., or −40° C. to 15° C. In some embodiments, for example, the glass transition temperature may be about −40° C. to −15° C. Additionally, the (meth)acrylic polymer may have a pH of 3 to 11, for example from 3 to 10. In some embodiments, for example, the (meth)acrylic polymer may have a pH of neutral to slightly basic, for example 7 to 11, or 7 to 10. In some embodiments, the (meth) acrylic polymer may have a pH of 6 to 10, or 6 to 9. Also, in some embodiments, the pH may range from 9 to 10.

In some embodiments, for example, the (meth)acrylic polymer may include an acrylic or methacrylic latex polymer. Some nonlimiting examples of suitable (meth)acrylic polymers include the RHOPLEX line of polymers (e.g., RHOPLEX AC-464, RHOPLEX AC-264, RHOPLEX EC-1791, and RHOPLEX EC-2540) and the TAMOL line of products (e.g., TAMOL 2002) available from The Dow Chemical Company (Midland, Mich.), the RHOPLEX line of polymers (e.g., RHOPLEX VSR-50, RHOPLEX EC-2885, and LIPACRYL MB-3640) available from Rohm and Haas (Philadelphia, Pa.; a subsidiary of The Dow Chemical Company (Midland, Mich.)), the LIPACRYL line of polymers (e.g., LIPACRYL MB-3640) and RINSEABLE PRIMER RP-2 available from Rohm and Haas (Philadelphia, Pa.; a subsidiary of The Dow Chemical Company (Midland, Mich.)), and the ACRYSHIELD® line of acrylic coatings (e.g., ACRYSHIELD® A590 and ACRYSHIELD® A179) available from National Coatings Corp. (Camarillo, Calif.).

The (meth)acrylic polymer may be present in the coating composition used to form the hydrophobic coating in an amount of 75 wt % or greater. In some embodiments, for example, the (meth)acrylic polymer may be present in the coating composition used to form the hydrophobic coating in an amount of 75 wt % to 90 wt %, for example, 75 wt % to 85 wt %.

The wax in the coating composition may be any suitable wax. For example, in some embodiments, the wax may include a polyethylene wax, polypropylene wax, carnauba wax, paraffin wax, microcrystalline wax, scale wax, acrylic wax, and/or the like. In some embodiments, for example, the wax may be a nonionic or anionic wax. For example, in some embodiments, the wax may include a nonionic microcrystalline wax emulsion, a nonionic paraffin wax emulsion, an anionic paraffin/polyethylene wax emulsion, an anionic scale wax emulsion, and/or an anionic paraffin/polyethylene wax co-emulsion. A single wax may be used, or a combination of two or more waxes may be used. Some nonlimiting examples of suitable waxes include the HYDROLUBE® line of waxes (e.g., HYDROLUBE® 480 and HYDROLUBE® 743) available from Michelman, Inc. (Cincinnati, Ohio), and the MICHEM® line of emulsions (e.g., MICHEM® Emulsion 36840, MICHEM® Emulsion 70750 and MICHEM® Lube 270R) also available from Michelman, Inc. (Cincinnati, Ohio).

The wax may be present in the coating composition used to form the hydrophobic coating in an amount of 10 wt % or less. For example, the wax may be present in the coating composition used to form the hydrophobic coating in an amount of 8 wt % or less, or 7 wt % or less.

The coupling agent in the coating composition may be any suitable coupling agent. For example, in some embodiments, the coupling agent may include a silane or siloxane coupling agent. In some embodiments, for example, the coupling agent may include an alkyl and/or alkoxy functional silane or siloxane. For example, in some embodiments, the coupling agent may be selected from alkyl silanes, alkyl siloxanes, alkoxy silanes, alkoxy siloxanes, functionalized alkoxy silanes, functionalized alkyl silanes, functionalized alkoxy siloxanes, and/or functionalized alkyl siloxanes. The functional groups in the functionalized silanes and siloxanes may be any suitable functional groups, including (but not limited to) alkyl groups (linear or branched), amino groups, halogen-containing groups (e.g., fluoro-containing groups, such as, for example, fluoroalkyl groups) and glycol groups. Additionally, in some embodiments, the coupling agent may include a water-borne and/or sol-gel based silane or siloxane.

For example in some embodiments, silane coupling agent may be a multi-functional compound with at least one functional group capable of bonding to the surface of the pigmented particles (i.e., the pigment coated particulate substrate), and at least one other functional group capable of cross-linking with the (meth)acrylic polymer. In some embodiments, for example, the silane coupling agent may include a compound represented by Formula 1.

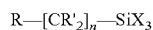    Formula 1

In Formula 1, R is a functionalized organic group, R' is H or a C1 to C5 alkyl group, n is an integer of 1 to 10, and X is a hydrolyzable group (e.g., a hydroxy group, or an alkoxy group). In Formula 1, geminal and vicinal R' groups may be the same or different. The functionalized organic group may include an organic group that includes a functional group capable of cross linking with the polymer. According to some embodiments, the organic group may include a functionalized alkyl or cycloalkyl group in which the functional group may include an amino group, a nitrogen-containing group, an epoxy group, a hydroxy group, or other suitable functional groups capable of reacting with the polymer.

Nonlimiting examples of suitable silane coupling agents include bis(2-hydroxyethyl)-3-amino-propyltriethoxysilane, 3-aminopropyl-triethoxysilane, 3-ureidopropyltriethoxysilane, N-(2-amino-ethyl)-3-aminopropyltrimethoxysilane, 3-aminopropyl-triethoxysilane, tri-methoxysilylpropyl-diethylenetriamine, 2-(3,4-epoxycyclohexyl)ethyltri-methoxysilane, and 3-glycidoxypropyltri-methoxysilane. In some embodiments, for example, the coupling agent may be selected from N(beta-aminoethyl) gamma-aminopropyl trimethoxy silane, polyethyleneglycol-functional alkoxysilanes, oligomeric short-chain alkylfunctional silanes, modified fluoroalkyl siloxanes, propyltriethoxysilane, and/or the like. A single coupling agent may be used, or a combination of two or more coupling agents may be used. Some nonlimiting examples of suitable coupling agents include the DYNASYLAN® line of silanes and siloxanes (e.g., DYNASYLAN® SIVO 112, DYNASYLAN® SIVO 113, DYNASYLAN® SIVO 110, DYNASYLAN® PTEO, DYNASYLAN® F 8815, DYNASYLAN® 9896 and DYNASYLAN® 4148) available from Evonik Industries AG (Essen, Germany), and the SILQUEST® line of silanes and siloxanes (e.g., SILQUEST® A-1120, SILQUEST® A-1630A and SILQUEST® A-137) available from Momentive Performance Materials, Inc. (Waterford, N.Y.).

The coupling agent may be present in the coating composition used to form the hydrophobic coating in an amount of 15 wt % or less. For example, in some embodiments, the coupling agent may be present in the coating composition used to form the hydrophobic coating in an amount of 10 wt % or less.

When used, the antioxidant in the coating composition may be any suitable antioxidant. Nonlimiting examples of suitable antioxidants include salts of hypophosphorous acid, alkylphenols, hydroxyphenylpropionates, hydroxybenzyl compounds, alkylidene bisphenols, secondary aromatic amines, thiobisphenols, aminophenols, thioethers, phosphites, phosphonites, and sterically hindered amines. For example, in some embodiments, the antioxidant may include a salt of hypophosphorous acid. For example, in some embodiments, the antioxidant may include an alkali or alkaline earth metal salt of hypophosphorous acid. In some embodiments, for example, the antioxidant may be selected from sodium hypophosphite, potassium hypophosphite and/or calcium hypophosphite. In some embodiments, for example, the antioxidant includes sodium hypophosphite. A single antioxidant may be used, or a combination of two or more antioxidants may be used.

When used, the antioxidant may be present in the coating composition used to form the hydrophobic coating in an amount of 5 wt % or less. For example, in some embodiments, the antioxidant may be present in the coating composition used to form the hydrophobic coating in an amount of 0 wt % (i.e., not present in the composition) to 5 wt %, or greater than 0 wt % to 5 wt %. In some embodiments, for example, the antioxidant is present in the coating composition used to form the hydrophobic coating in an amount of 1 wt % to 3 wt %, for example 1 wt % 2 wt %. However, in some embodiments, the antioxidant may be omitted.

While the hydrophobic coating provides weather and UV resistance, the hydopohobic coating also decreases the total solar reflectance of the reflective particulate. Accordingly, in some embodiments, the underlying pigmented particulate (i.e., the substrate coated with the inorganic binder and the pigment) has a total solar reflectance of 80% or higher. When the underlying pigmented particulate has a total solar reflectance within this range, the reflective particulate (i.e., the pigmented particulate coated with the hydrophobic exterior coating) maintains a suitable total solar reflectance despite the decrease in total solar reflectance caused by application of the hydrophobic coating. Indeed, in some embodiments, the hydrophobic coating may decrease the total solar reflectance of the underlying pigmented particulate by up to 5%, for example, from 2% to 5%. Consequently, in some embodiments, the pigmented particulate (i.e., prior to application of the hydrophobic coating) may have a total solar reflectance of 80% to 90%, for example 80% to 88%, 80% to 87%, 80% to 86%, 85% to 90%, or 80% to 88%.

According to embodiments of the present invention, a method of preparing the reflective particulates (ore reflective granules, or reflective particulate compositions) includes coating the particulate substrate with the pigment to form pigmented particulates (or pigmented granules or a pigmented particulate composition), and coating the pigmented particulate with the hydrophobic coating composition to form the hydrophobic coating. In some embodiments, the pigment may be coated on the particulate substrate by a high shear process, a layered application process, or a direct application process. In embodiments of the high shear process, the pigment, inorganic binder, a liquid media (for example, water), and optionally a dispersant may be mixed in a high shear mixer. This mixture may then be applied to the particulate substrate (e.g., by mixing the particulate substrate with the pigment mixture) to form a pigment coated substrate. The pigment coated substrate may then be heat treated at a temperature of 300 C to 1100 C to form the pigmented particulate. The hydrophobic coating composition may then be applied to the pigmented particulate, followed by drying in an oven or kiln heated at a temperature of 80 C to 200 C, as discussed further below.

In embodiments of the layered application process, the particulate substrate may be mixed with the inorganic binder (e.g., up to 20% by weight based on the weight of the particulate substrate), and then the pigment (e.g., up to 25% by weight based on the weight of the particulate substrate) may be added to the mixture followed by additional mixing. The resulting mixture may then be heat treated at a temperature of 300 C to 1100 C to form the pigmented particulate. When the mixture is heat treated at a temperature within this range, the resulting pigmented particulate (i.e., the substrate coated with the pigment and inorganic binder, but without the hydrophobic exterior coating) may have a suitable total solar reflectance. In particular, the mixture may have a total solar reflectance high enough that the application of the hydrophobic coating will not decrease the total solar reflectance of the resulting reflective particulate to unacceptable levels. In some embodiments, for example, the resulting mixture may be heat treated at a temperature of 500 C to 110 0C, for example 500 C to 1000 C. Additionally, in some embodiments, the resulting mixture may be heat treated at a temperature of 800 C to 1100 C, for example 800 C to 1000 C. The hydrophobic coating composition may then be applied to the pigmented particulate, as discussed further below.

In embodiments of the direct application process, the particulate substrate may be mixed with the pigment (e.g., up to 25% by weight based on the weight of the particulate substrate), and then the inorganic binder (e.g., up to 20% by weight based on the weight of the particulate substrate) may be added to the mixture followed by additional mixing. The resulting mixture may then be heat treated at a temperature of 300 C to 1100 C to form the pigmented particulate. The hydrophobic coating composition may then be applied to the pigmented particulate, as discussed further below.

As noted above, in some embodiments of the high shear and direct application processes, the pigment and the particulate substrate may be suspended in a liquid medium during the initial mixing. Any suitable liquid medium may be used, including, but not limited to aqueous media (for example, water), organic solvents and mixtures thereof (such as, for example, dilute alcohols). However, in some embodiments, an aqueous media is used, and in some embodiments, the aqueous media is water. Although organic solvents and organic/aqueous mixtures may be used, these media contribute volatile organic components (VOC), and are therefore less desirable in large scale operations for environmental and safety reasons.

When used, the liquid media is present in the suspension (i.e., the mixture of the particulate substrate and the inorganic binder) in an amount corresponding to the water demand of the substrate. As used herein, the "water demand of the substrate" is used in its art-recognized sense to refer to the fractional amount of water required to yield a specified consistency or workability of the substrate mixture. As would be understood by those of ordinary skill in the art, the amount of water or liquid media required to meet the "water demand of the substrate" may vary depending on the type of substrate used, and on the particle size or particle size distribution of the substrate. In any event, when used, the liquid media (e.g., water) is driven off after the initial mixing during the subsequent heat treatment at elevated temperature.

In the pigment coating processes in which the pigment and/or binder are mixed directly with the particulate substrate (e.g., the layered method and the direct method), the mixing can be performed in any suitable manner and using any suitable machinery. In some embodiments, for example, the mixing is performed using a cement mixer, a drum mixer, a disc mixer, a pin mixer, a ribbon-paddle blender, a planetary mixer, a double cone blender, a V blender, a vertical blender or a screw-auger mixer.

After the pigment has been coated on the particulate substrate to form the pigmented particulate, the hydrophobic coating may be applied to the pigmented particulate to the form the reflective particulates (or reflective granules, or reflective particulate composition) according to embodiments of the present invention. In some embodiments, for example, the (meth)acrylic polymer, the wax and the coupling agent may be mixed to form the coating composition. An acid may optionally be added to this mixture to aid in hydrolyzing the coupling agent. Acid catalyzed hydrolysis of alkoxysilanes is well known, and those of ordinary skill in the art would be capable of selecting a suitable acid for this purpose. However, some nonlimiting examples of suitable acids for catalyzing the hydrolysis of the silane coupling agent include hydrochloric acid (HCl), nitric acid ($HNO_3$), and acetic acid ($CH_3COOH$). Additionally, the amount or concentration of the acid needed to effectively catalyze the hydrolysis reaction will vary according to the silane coupling agent used, and the selection of a suitable amount of concentration of the acid for this purpose is within the skill of ordinary artisans in the field.

After addition of the acid catalyst (if used), the resulting mixture may be stirred and allowed to react until a substantially homogenous coating solution is formed. In some embodiments, for example, the mixture may be stirred for at least one hour or longer. This coating solution is then applied to the pigmented particulates, e.g., by mixing the solution with the pigmented particulates. The mixed particulates are then dried in an oven or kiln heated at a temperature of 80 C to 300 C to form the reflective particulates.

Although various embodiments of the invention have been described, additional modifications and variations will be apparent to those skilled in the art. For example, the compositions and particulates may have additional components, which may be present in various suitable amounts, for example, other additives suitable to improve strength, reduce odor, and/or otherwise modify the properties of the composition and particulates manufactured. Similarly, the methods of preparing the compositions and particulates as described herein by way of example embodiments may be modified in accordance with the knowledge in the field to which the various embodiments pertain. For example, the methods of preparing the compositions and particulates may include additional steps, may be performed at various temperatures, and/or may be otherwise suitably modified (e.g., as described with reference to the compositions and particulates). As such, the invention is not limited to the embodiments specifically disclosed, and the composition, the particulates, and the methods of preparing the compositions and particulates may be modified without departing from the invention, which is limited only by the appended claims and equivalents thereof.

Throughout the text and claims, any use of the word "about" reflects the penumbra of variation associated with measurement, significant figures, and interchangeability, all as understood by a person having ordinary skill in the art to which this invention pertains. Further, a used herein, the term "substantially" is used as a term of approximation and not as a term of degree, and is intended to account for normal variations and deviations in the measurement or assessment associated with the composition, the particulates, and the method of preparing the compositions and particulates (e.g., in the description of physical or chemical properties of various components or compositions and in the description of amounts of various components).

What is claimed is:

1. A reflective particulate composition, comprising:
   a particulate substrate;
   an inorganic binder coated on the particulate substrate;
   a pigment coated on the particulate substrate; and
   a hydrophobic exterior coating on the particulate substrate the hydrophobic exterior coating comprising a (meth) acrylic polymer, a wax, a coupling agent, and an antioxidant, wherein the antioxidant comprises an alkali or alkaline earth metal salt of hypophosphorous acid.

2. The reflective particulate composition according to claim 1, wherein the reflective particulate composition has a solar reflectance of 70% or greater.

3. The reflective particulate composition according to claim 1, wherein the particulate substrate has a particle size distribution in which a majority of particles of the particulate substrate have a size between 12 and 50 mesh.

4. The reflective particulate composition according to claim 1, wherein the particulate substrate comprises silica in an amount of 50% by weight or greater based on 100% by weight of the particulate substrate.

5. The reflective particulate composition according to claim 1, wherein the inorganic binder is selected from the group consisting of alkali metal silicates, alkali metal carbonates, alkali metal sulfates, alkaline earth metal silicates, alkaline earth metal carbonates, alkaline earth metal sulfates, boric acid, Portland cement, alkyl silicates, and combinations thereof.

6. The reflective particulate composition according to claim 1, wherein the inorganic binder is present in an amount of 20% by weight or less, based on 100% by weight of the particulate substrate.

7. The reflective particulate composition according to claim 1, wherein the pigment comprise a clay-based pigment composition comprising a kaolin clay in an amount of 50% by weight or greater based 100% by weight of the clay-based pigment composition.

8. The reflective particulate composition according to claim 7, wherein the clay-based pigment composition further comprises a secondary pigment component selected from the group consisting of transition metal oxides, alkaline earth metal sulfates, alkaline earth metal silicates, alkali metal silicates, and cristobalite.

9. The reflective particulate composition according to claim 1, wherein the pigment is present in an amount of 25% by weight or less based on 100% by weight of the particulate substrate.

10. The reflective particulate composition according to claim 1, wherein the hydrophobic exterior coating further comprises an antioxidant selected from the group consisting of alkylphenols, hydroxyphenylpropionates, hydroxybenzyl compounds, alkylidene bisphenols, secondary aromatic amines, thiobisphenols, aminophenols, thioethers, phosphites, phosphonites, sterically hindered amines, and combinations thereof.

11. The reflective particulate composition according to claim 1, wherein the coupling agent comprises a silane coupling agent.

12. The reflective particulate composition according to claim 1, wherein the wax comprises polyethylene wax, polypropylene wax, carnauba wax, paraffin wax, microcrystalline wax, scale wax, acrylic wax, or a combination thereof.

13. A method of making the reflective particulate composition according to claim 1, the method comprising:
   mixing the particulate substrate with the inorganic binder to form a binder particulate substrate;
   mixing the binder particulate substrate with the pigment to form a pigmented particulate;
   heat treating the pigmented particulate; and
   mixing the pigmented particulate with a hydrophobic coating composition to form the hydrophobic exterior coating on the pigmented particulate, the hydrophobic coating composition comprising the (meth)acrylic polymer, the wax, the antioxidant and the coupling agent.

14. The method according to claim 13, wherein the heat treating the pigmented particulate is performed at a temperature of 300° C. to 1100° C.

15. The method according to claim 14, wherein the heat treating the pigmented particulate is performed at a temperature of 300° C. to 1100° C.

16. A method of making the reflective particulate composition according to claim 1, the method comprising:
   mixing the particulate substrate with the pigment to form a pigment particulate substrate;
   mixing the pigment particulate substrate with the inorganic binder to form a pigmented particulate;
   heat treating the pigmented particulate; and
   mixing the pigmented particulate with a hydrophobic coating composition to form the hydrophobic exterior coating on the pigmented particulate, the hydrophobic coating composition comprising the (meth)acrylic polymer, the wax, the antioxidant and the coupling agent.

17. The reflective particulate composition of claim 1, wherein the antioxidant comprises sodium hypophosphite, potassium hypophosphite, calcium hypophosphite, or a combination thereof.

18. A method of making a reflective particulate composition, the composition comprising
a particulate substrate;
an inorganic binder coated on the particulate substrate;
a pigment coated on the particulate substrate; and
a hydrophobic exterior coating on the particulate substrate, the hydrophobic exterior coating comprising a (meth)acrylic polymer, a wax, a coupling agent, the method comprising:
mixing the pigment, the inorganic binder, a dispersant and water to form a pigment mixture;
adding the particulate substrate to the pigment mixture to form a pigmented particulate;
heat treating the pigmented particulate; and
mixing the pigmented particulate with a hydrophobic coating composition to form the hydrophobic exterior coating on the pigmented particulate, the hydrophobic coating composition comprising the (meth)acrylic polymer, the wax, and the coupling agent, wherein the hydrophobic coating composition is form by mixing the (meth)acrylic polymer, the wax, and the coupling agent to form a mixture, and adding an acid to the mixture.

* * * * *